US006611421B2

(12) United States Patent  
Meadows et al.

(10) Patent No.: US 6,611,421 B2
(45) Date of Patent: Aug. 26, 2003

(54) NON-POLARIZED TANTALUM CAPACITOR AND CAPACITOR ARRAY

(75) Inventors: Paul M. Meadows, Glandale, CA (US); James A. McAllister, Springvale, ME (US); David H. Payne, Llano, CA (US); Douglas M. Edson, Kennebunk, ME (US)

(73) Assignees: AVX Corporation, Myrtle Beach, SC (US); Advanced Bionics Corporation, Santa Clarita, CA (US)

( * ) Notice: Subject to any disclaimer, the term of this patent is extended or adjusted under 35 U.S.C. 154(b) by 0 days.

(21) Appl. No.: 09/950,289

(22) Filed: Sep. 7, 2001

(65) Prior Publication Data

US 2002/0048139 A1 Apr. 25, 2002

Related U.S. Application Data

(60) Provisional application No. 60/231,402, filed on Sep. 8, 2000.

(51) Int. Cl.$^7$ ................................................ H01G 4/38
(52) U.S. Cl. .................. 361/328; 361/303; 361/320; 361/433; 361/540; 361/330; 29/25.03
(58) Field of Search ................................ 361/529, 528, 361/523, 508, 509, 510, 322, 330, 303, 328, 433, 519, 518, 540, 772; 29/25.03

(56) References Cited

U.S. PATENT DOCUMENTS

| 4,984,134 A | * | 1/1991 | Locke |
| 5,105,341 A | * | 4/1992 | Stephenson et al. |
| 5,198,968 A | | 3/1993 | Galvagni |
| 5,357,399 A | | 10/1994 | Salisbury |
| 5,424,908 A | | 6/1995 | Kanetake |
| 5,486,977 A | * | 1/1996 | Hasegawa |
| 5,693,104 A | * | 12/1997 | Kuriyama |
| 5,777,840 A | * | 7/1998 | Oney |
| 5,926,363 A | | 7/1999 | Kuriyama |
| 6,040,229 A | | 3/2000 | Kuriyama |
| 6,288,890 B1 | | 9/2001 | Saito et al. |
| 6,310,765 B1 | | 10/2001 | Tanahashi et al. |

OTHER PUBLICATIONS

*Technical Information: Basic Tantalum Capacitor Technology*, by John Gill; posted on corporate website www.avxcorp.com/docs/techinfo/bsctant.pdf Jul. 1995 Myrtle Beach, SC.

*AVX Surface Mount Tantalum Capacitors*, AVX Product Catalog Aug. 1998 Myrtle Beach, SC.

* cited by examiner

Primary Examiner—Dean A. Reichard
Assistant Examiner—Nguyen Ha
(74) Attorney, Agent, or Firm—Dority & Manning, P.A.

(57) ABSTRACT

Non-polar tantalum capacitors and non-polar tantalum capacitor arrays with compact designs are provided. The reduced volume and footprint of the capacitors and arrays in turn reduces the amount of space required in any device in which they are used. In addition, the cost of materials is reduced, and the manufacturing is simplified. Some embodiments of the present invention provide an electromechanical connector between the anode rods of each pair of polar tantalum capacitors, and insulation between the remainder of the capacitor bodies, thus providing a non-polar tantalum capacitor. These non-polar capacitors are mechanically connected to make a non-polar tantalum capacitor array. Other embodiments of the present invention provide for physically connecting the anode rods of the polar capacitors. An insulating encapsulant around the connected rods and between the polar capacitor bodies also holds the capacitors and capacitor arrays together. Additional embodiments of the invention provide an insulating shell in which the polar capacitors are placed, combined with electrical connection and encapsulation of the anode rods.

33 Claims, 8 Drawing Sheets

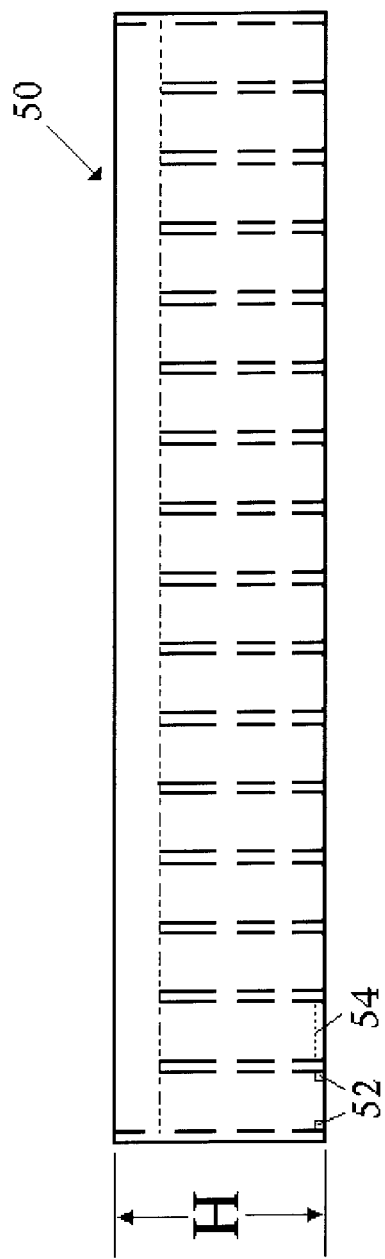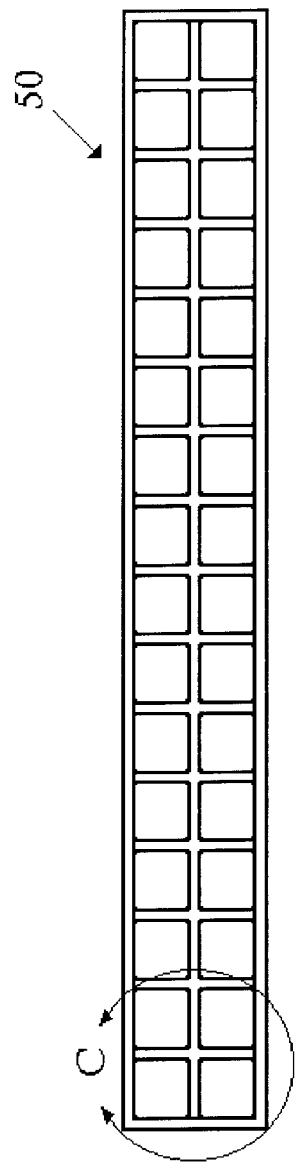

NON-POLARIZED TANTALUM CAPACITOR AND CAPACITOR ARRAY

PRIORITY CLAIM

Priority is hereby claimed to previous filed U.S. provisional application with the same title as present, assigned U.S. Ser. No. 60/231,402, filed Sep. 8, 2000.

FIELD OF THE INVENTION

The present invention generally relates to the field of capacitors, and more particularly related to a non-polarized capacitor and to a non-polarized tantalum capacitor array.

BACKGROUND OF THE INVENTION

The present subject matter generally concerns a non-polarized tantalum capacitor and corresponding capacitor array. More particularly, the disclosed technology enables a non-polarized tantalum capacitor array with improved volumetric efficiency and reduced footprint.

Tantalum capacitors are known for their high capacitance value and compactness. Non-polarized tantalum capacitors are traditionally provided by connecting two polarized tantalum capacitors together, and more particularly are most often provided by electrically and mechanically connecting the cathodes of two polar tantalum capacitors together and by having the anodes provide the terminal access to the capacitor. Despite the existing compactness of known polar and non-polar tantalum capacitors, and tantalum capacitor arrays, there are constant efforts to reduce the volume, and more particularly, the footprint of these electronic components. This in turn allows the miniaturization of the devices in which these components are used.

An additional known challenge with tantalum capacitors is the fragility of the anode rod, particularly where it protrudes from one end of the capacitor. Mechanical and electrical connections, e.g. of leads or circuit boards, to the anodes often results in breakage, and thus shorting or a lost connection to the remainder of the capacitor. This problem is compounded by the fact that connections to the tantalum anode rods are also susceptible to failure. These connections are typically made with leads of a solderable material, such as nickel or tinned nickel, which is difficult to weld to the tantalum and results in a very fragile connection.

In order to protect the anode rods, and the connections to the anode rods, it is typical to encase the rods and connections, and the entire capacitor assembly in a substantial quantity of potting material. This substantially increases the volume of polar, and even more so, of non-polar tantalum capacitors. In addition to increased volume, the material and manufacturing costs are thus increased, and the footprint of the resulting capacitor or capacitor assembly is also increased.

As an example, U.S. Pat. No. 4,984,134 discloses a non-polar tantalum capacitor that is produced by laying two polar capacitors end-to-end, with the tantalum rods touching. After the tantalum rods are welded together, the area between the polar capacitors and extending down the sides of the capacitors is encased in potting material.

However, significant improvements over this design are still possible and desirable, particularly regarding footprint size, which is a critical factor in the efficient use of available circuit board surface area. In addition, although the design uses less potting material than in traditional designs, still a significant amount is used, resulting in higher manufacturing and part costs. Finally, while the reliability of the anode weld may be improved over traditional methods, it is at the cost of precious circuit board area and overall volume.

The disclosures of foregoing United States patents are hereby fully incorporated into this application by reference thereto.

BRIEF SUMMARY OF THE INVENTION

The present subject matter recognizes and addresses various of the foregoing drawbacks and other shortcomings encountered in the prior art of tantalum capacitor technology. Thus, broadly speaking, a principal object of the presently disclosed technology is to provide an improved tantalum capacitor. More particularly, the disclosed non-polarized tantalum capacitor can be formed as a single capacitor unit or as a capacitor array.

It is another principal object of the present subject matter to provide compact non-polar capacitors, and compact non-polar capacitor arrays, with reduced volume, and significantly reduced footprint.

Yet another object of the present technology is to provide capacitors and capacitor arrays that are relatively simple and inexpensive to produce.

A still further object of the present subject matter is to provide simple and secure features for electrical and mechanical connection between the polar capacitors that are combined to form the non-polar capacitors. Further, the connection between the capacitor or capacitor array and the destination substrate is made in a simple and reliable fashion.

Additional objects and advantages of the present subject matter are set forth in, or will be apparent to those of ordinary skill in the art from, the detailed description herein. Also, it should be further appreciated by those of ordinary skill in the art that modifications and variations to the specifically illustrated, referenced, and discussed features and steps hereof may be practiced in various embodiments and uses of this invention without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, especially different presently preferred embodiments, of this invention may include various combinations or configurations of presently disclosed features, steps, or elements, or their equivalents (including combinations of features or steps or configurations thereof not expressly shown in the figures or stated in the detailed description).

Some embodiments of the present subject matter provide non-polar tantalum capacitors of reduced volume and with a reduced footprint. Other embodiments may provide non-polar tantalum capacitor arrays of reduced volume and with a reduced footprint.

In some embodiments of the present technology, each pair of polar tantalum capacitors is provided with, among other things, a conductive material for attachment to the anode rods protruding from each of the tantalum capacitors. This conductive attachment provides the electrical and mechanical connection that produces a non-polar capacitor from two polar capacitors, each of which has a capped main body to otherwise insulate them from each other.

In other embodiments of the present subject matter, the anode rods protruding from the polar tantalum capacitors are bent towards each other, then welded. The space between the polar capacitors, and the welded anode rods, are then filled with an insulating material, which also holds the non-polar capacitor together.

Additional embodiments of the subject tantalum capacitor technology provide capacitor arrays produced by attaching multiple non-polar capacitors together. These arrays may be attached with conductive connectors, such as printed circuit boards (PCBs), that provide the electrical connection between each pair of polar capacitors, and the mechanical connection between all the polar capacitors of the array. Other arrays are held together with an encapsulating insulating material that is provided over the welded anodes of each pair of polar capacitors, and between the capacitor bodies.

A still further embodiment of the invention provides an insulating shell into which the polar capacitors are placed. The anode rods are bent and welded, and an encapsulant protects and insulates the anode rods.

Additional embodiments of the present subject matter, not necessarily expressed in this summarized section, may include and incorporate various combinations of aspects of features or parts referenced in the summarized objectives above, and/or features or parts as otherwise discussed in this application.

Thus, the present invention provides a non-polar tantalum capacitor and a non-polar tantalum capacitor array that, inter alia, have a reduced volume and a reduced footprint. Reduced volume and footprint allow devices containing the capacitor or capacitor array of the present invention to be smaller, or allow additional components to be introduced into the device. These advantages are critical in the present environment of miniaturization.

Other advantages of the present invention include (but are not limited to) reduced material costs, simplified manufacturing processes, and thus reduced manufacturing time and labor costs. The capacitor and capacitor array of the present invention may be used advantageously wherever an electrical package requires a relatively large capacitance value in a relatively small package, such as in an implantable medical device or other application.

Those of ordinary skill in the art will better appreciate the features and aspects of such embodiments, and others, upon review of the remainder of the specification.

BRIEF DESCRIPTION OF THE DRAWINGS

The above and other aspects, features, and advantages of the present invention, including the best mode thereof, will be more apparent from the following more particular description of the present subject matter, presented in conjunction with the appended figures, in which:

FIG. 6A displays a generally side view of another exemplary embodiment of a non-polar tantalum capacitor array in accordance with the present subject matter;

FIG. 6B depicts another view of the exemplary capacitor array illustrated in FIG. 6A.

Figure 1:
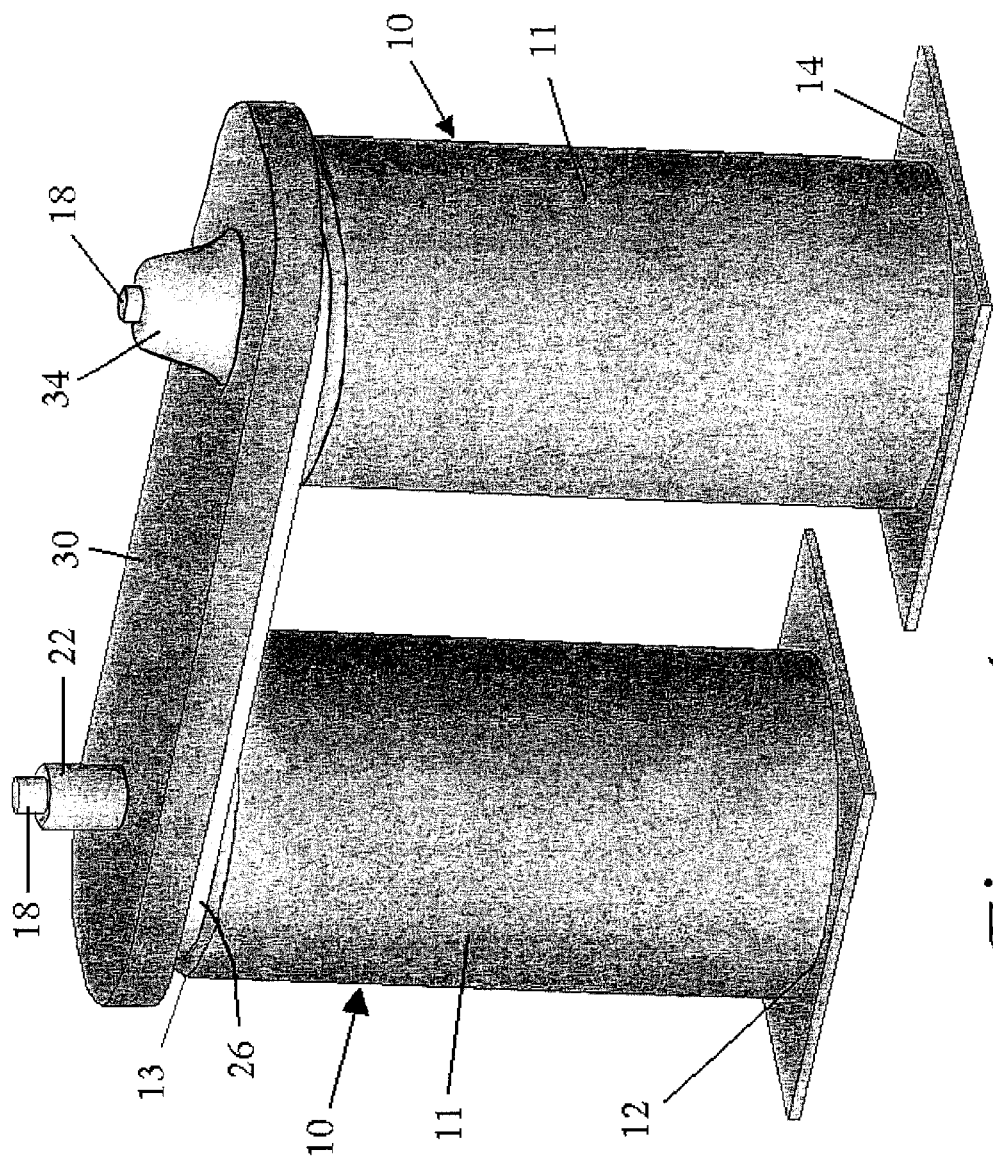
FIG. 1 illustrates a first exemplary embodiment of a non-polar tantalum capacitor in accordance with the present subject matter.

Repeat use of reference characters throughout the present specification and appended drawings is intended to represent same or analogous features or elements of the presently disclosed tantalum capacitor technology.

DETAILED DESCRIPTION OF THE DRAWINGS

The following description is of the best mode presently contemplated for carrying out the invention. The description is made merely for the purpose of describing the general principles of the invention. It should be noted that the exemplary embodiments disclosed herein should not insinuate any limitations of the subject mater. Features illustrated or discussed as part of one embodiment can be used on another embodiment to yield a still further embodiment. Additionally. Certain features may be interchanged with similar devices or features not expressly mentioned which perform the same or similar function.

Figure 2:
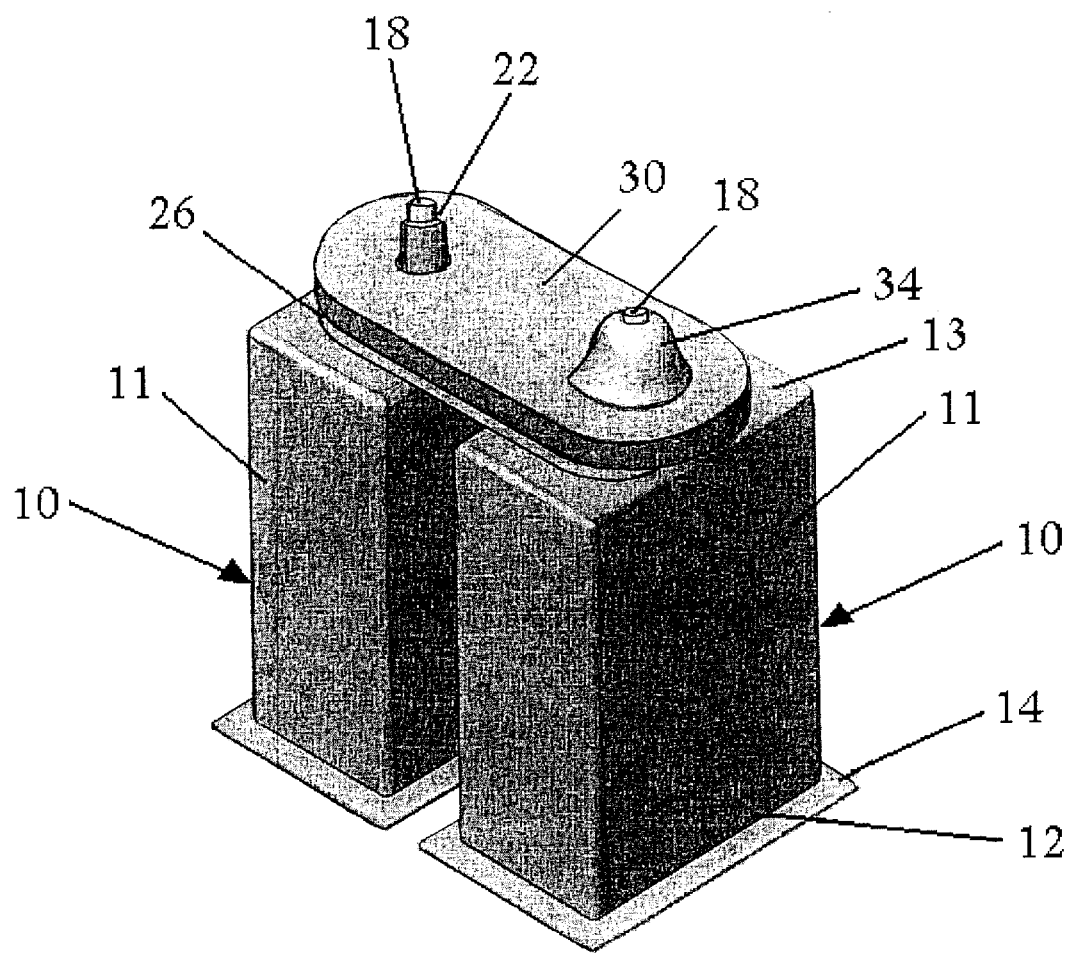
FIG. 2 illustrates a second exemplary embodiment of a non-polar tantalum capacitor in accordance with the present subject matter.

FIGS. 1 and 2 illustrate first and second exemplary embodiments, respectively, of a non-polar tantalum capacitor in accordance with the present subject matter. In both FIGS. 1 and 2, a polar capacitor element 10 (herein also called a capacitor slug, or simply slug 10) comprises the main portion of the polar tantalum capacitor. The surfaces 11 of slug 10 preferably comprise cathode surfaces, and these cathode surfaces 11 are preferably coated with conductive epoxy or other appropriate substance. As can be seen, slug 10 may be of a generally cylindrical shape (as in FIG. 1) or of a generally rectangular shape (as in FIG. 2), or may be any other useful shape. Capacitor slug 10 is characterized by two end surfaces, hereafter referred to as first end 12 and second end 13 of the capacitor slug 10. A circuit board contact pad 14 is preferably attached to the first end 12 of the slug 10 (and thus, the cathode portion of the polar capacitor) with, for example, conductive epoxy. Circuit board contact pad 14 is preferably made of conductive material, such as gold or gold-plated copper, and may be cylindrical, rectangular, or any other useful shape.

An anode rod 18 (also referred to as an anode wire, wire anode, or anode lead) protrudes from the second end 13 of each polar capacitor. It is preferred that anode rod 18 is trimmable and can be adjusted to a desired length. By electrically connecting the anode rods of two polar capacitors, a non-polar capacitor is created.

In a generally preferred embodiment, a conductive sleeve 22 is resistance or spot welded onto each anode rod 18. Sleeve 22 is used to displace a coating of thick oxide or other appropriate substance that is formed over the tantalum anode rod 18 during the anodization process used to prepare the polar capacitors. Sleeve 22 provides a surface for good electrical contact with anode rod 18, and is thus made of an electrically conductive material, such as gold.

Over the sleeved anode rods is placed a layer of insulation 26, and then a layer of conductive material 30. The insulation layer ensures that the conductive layer 30 is only in electrical contact with the anode portion of the polar capacitors, and not also in contact with the cathode portion 11 of the capacitors. Layers 26 and 30 have holes large enough to allow the anode rod 18 with conductive sleeve 22 to pass through the layers. Insulation layer 26 is preferably made of 0.125 mm (0.005 inch) thick Delrin® material. Conductive layer 30 is preferably made of gold plated copper. Alternatively, a very thin printed circuit board (PCB), flex circuit, or the like may be used, in which case the insulating and conductive layers are combined into one structure. For instance, a conductor (e.g., made of copper), which electrically connects the anode rods of the two polar capacitors, may be embedded in polyimide.

Conductive epoxy 34 or the like is applied over sleeves 22 (which may have a portion of anode rod 18 protruding from the top of the sleeve). If epoxy 34 is not self-curing, it must then be cured, which is typically accomplished by heating or photo-curing the epoxy, as is known in the art.

Figure 3A:
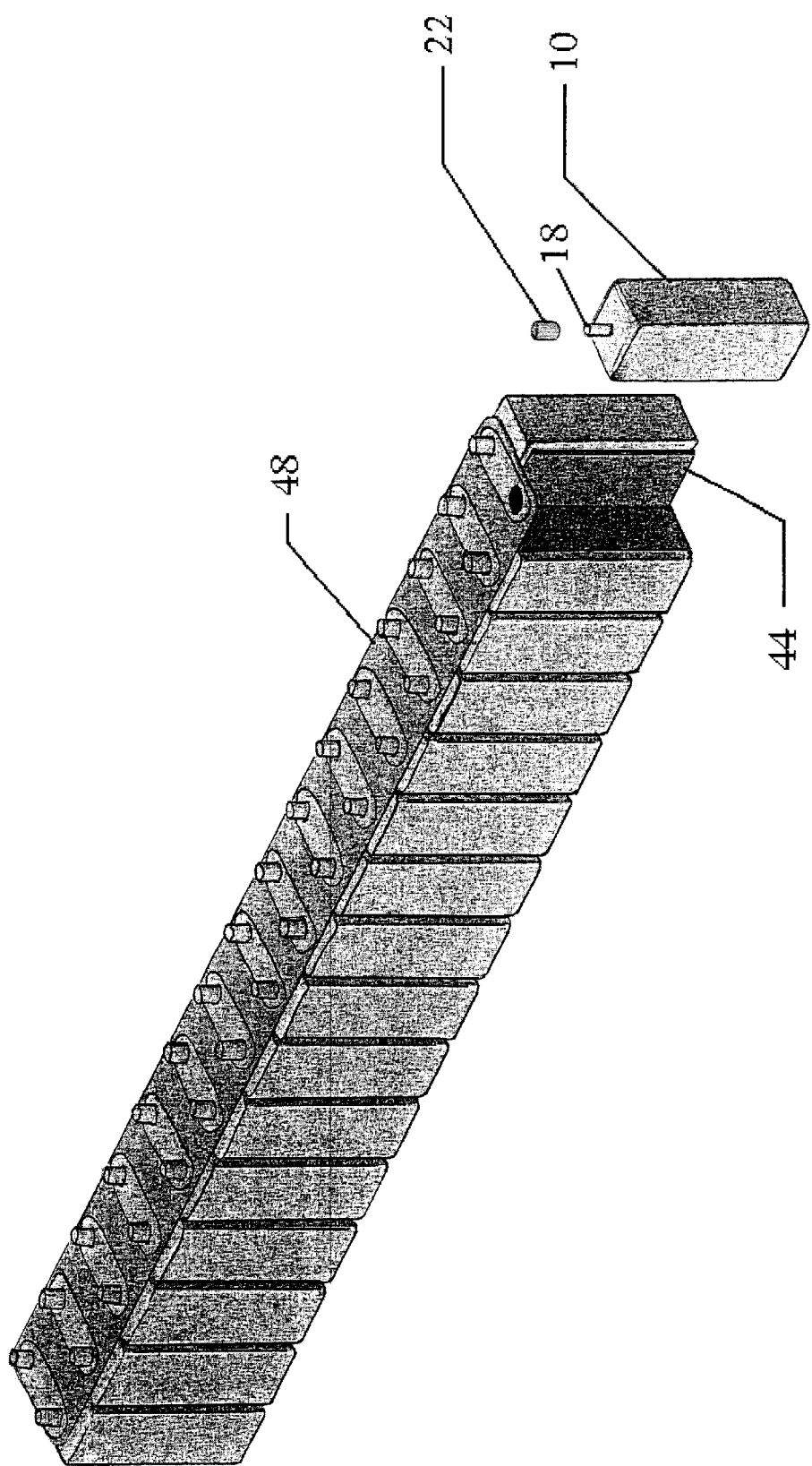
FIG. 3A depicts an exemplary embodiment of a non-polar tantalum capacitor array in accordance with the present subject matter, with an exemplary capacitor element removed and exploded.
Figure 3B:
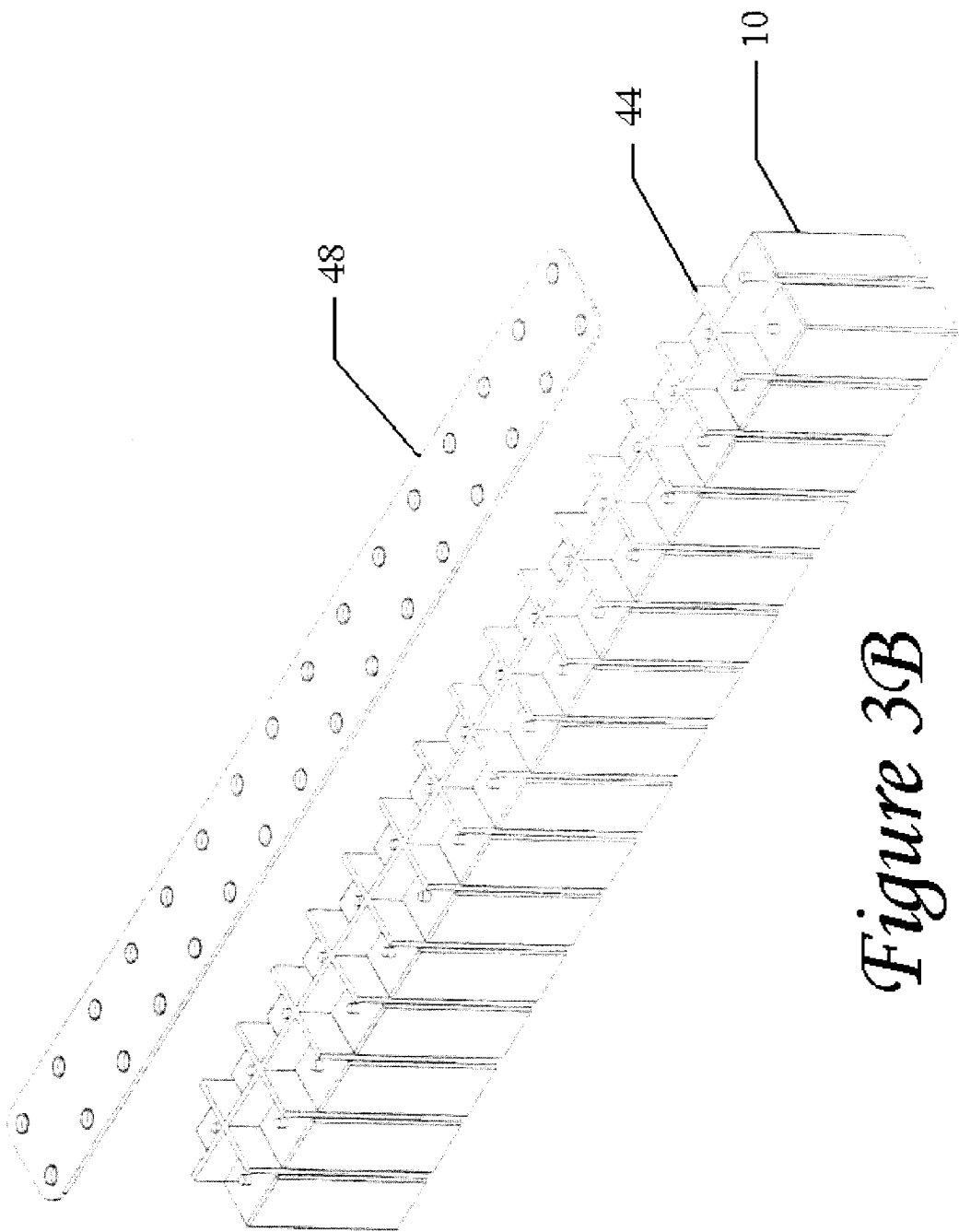
FIG. 3B is an exploded view of selected components of an exemplary capacitor array, such as the array of FIG. 3A.

In many instances, a capacitor array is required, rather than a single capacitor. A preferred embodiment of a non-polar capacitor array of the present invention is depicted in FIGS. 3A and 3B. In the present embodiment, each polar capacitor element, or slug, 10 has an anode rod 18 protruding from its top, which is trimmed, if necessary, and preferably fitted with a conductive (e.g., gold) sleeve 22. The capacitor slugs 10 may be arranged in some sort of symmetrical array formation. For instance, an exemplary such array may correspond to two rows of sixteen polar tantalum capacitors. Thus, a capacitor array of 32 polar tantalum capacitors will, in this example, form an array of 16 non-polar tantalum capacitors. It should be appreciated that tantalum capacitor arrays of other sizes may also be formed in accordance with the presently disclosed technology. A holding fixture may be used accordingly to position the slugs during manufacture of the array.

In one preferred embodiment of the present invention, capacitor slugs 10 are insulated from each other via an insulating capacitor array separator 44. In such a case, the array holding fixture is preferably comprised of the array separator 44 and an outer frame that surrounds the entire array during manufacture. Array separator 44 is preferably, but not necessarily, comprised of a one-piece structure, and is preferably made of polyurethane, and more preferably of high density polyethylene (HDPE). After the capacitor slugs 10 are in place with array separator 44 insulating the slugs from one another, an adhesive, such as non-conductive epoxy or potting compound is preferably applied to fix the slugs to the separator. Alternatively, an interference fit, along with the other components of the array and its attachment to the circuit board, is used to fix the slugs to the array separator.

A capacitor array connector 48 is positioned over the anode rods 18, sleeves 22, and atop the array of slugs 10, as depicted in FIG. 3A. As described earlier, this connector may be comprised of a layer of insulation and a layer of conductive material, or more preferably is a single structure, such as a flex circuit or very thin PCB connector board. As seen in FIG. 3A, the traces of a PCB advantageously connect the anode rods of each pair of adjacent polar capacitor slugs 10, preferably via gold traces. Alternatively, as in FIG. 3B, a conductor (e.g., made of copper) electrically connects the anode rods of each pair of polar capacitors, and is imbedded in polyimide.

Figure 4:
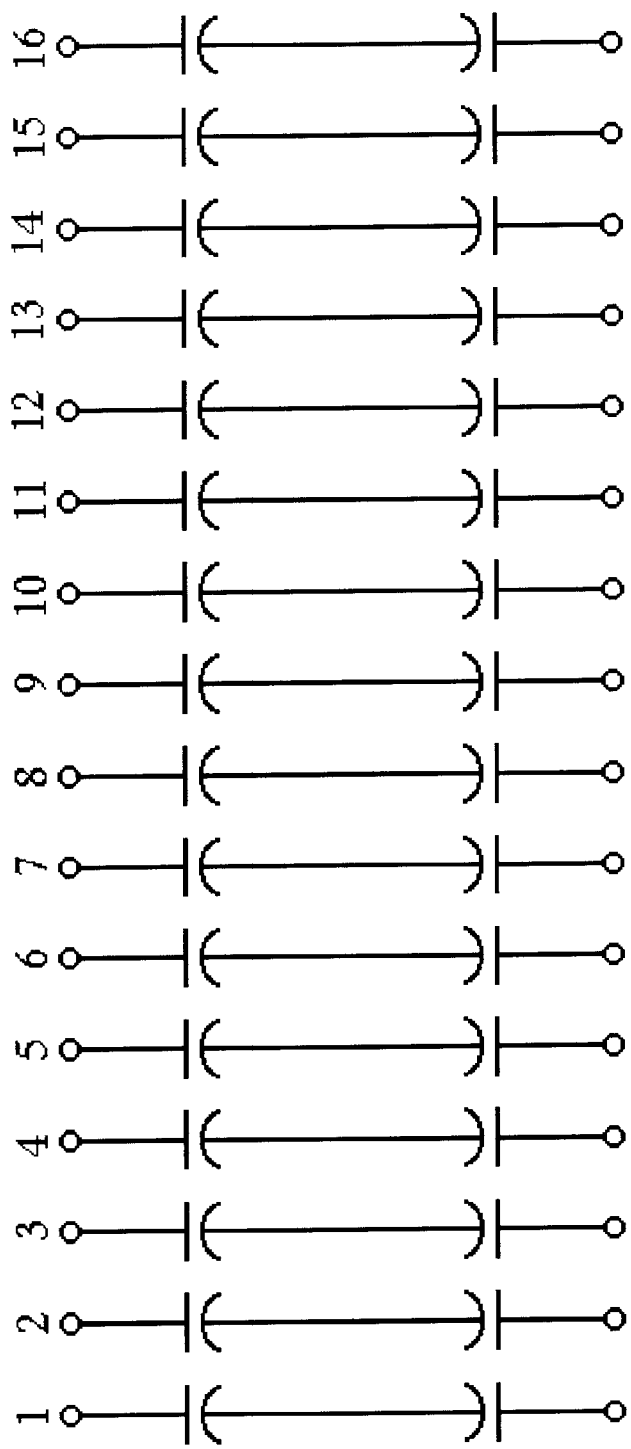
FIG. 4 displays a schematic representation of an exemplary non-polar capacitor array in accordance with the present subject matter.

A conductive epoxy or the like is preferably applied to the array at each anode rod/sleeve/connector interface, and then cured, as described previously relative to FIGS. 1 and 2. The capacitor array is thus completed, and ready to be removed from the holding fixture. If desired, the cathode portion accessible at the bottom of each capacitor slug 10 may be coated with a conductive material such as silver, to enhance electrical, and potentially also mechanical connection to the capacitor array. An electrical schematic of the resulting non-polar capacitor array is shown in FIG. 4. As with the previously described non-polar capacitors, the capacitor array is preferably attached to a circuit board contact pad 14 with conductive epoxy.

In another preferred embodiment of the invention, a non-polar capacitor array providing 16 non-polar tantalum capacitors, as again represented by the schematic of FIG. 4, is made without using a prefabricated capacitor array separator 44 or a prefabricated capacitor array connector 48. In such embodiment, thirty-two polar tantalum capacitor slugs 10 are positioned in a holding fixture which positions the slugs as close together as possible, so that they do not touch, and so that an insulating material can be introduced into the space between slugs.

Figure 5A:
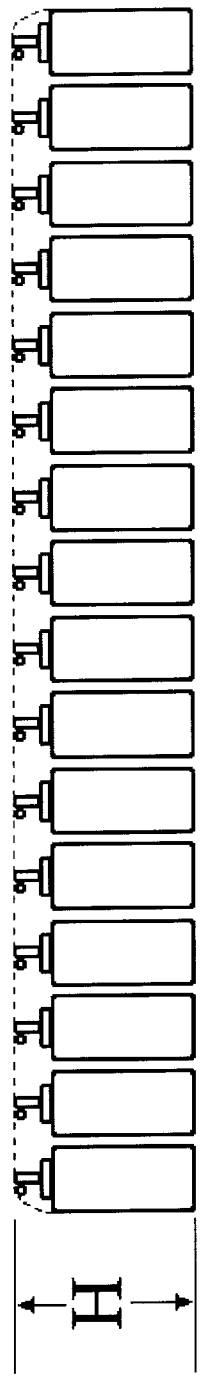
FIG. 5A is a generally side view of an exemplary embodiment of a non-polar tantalum capacitor array in accordance with the presently disclosed technology.
Figure 5B:
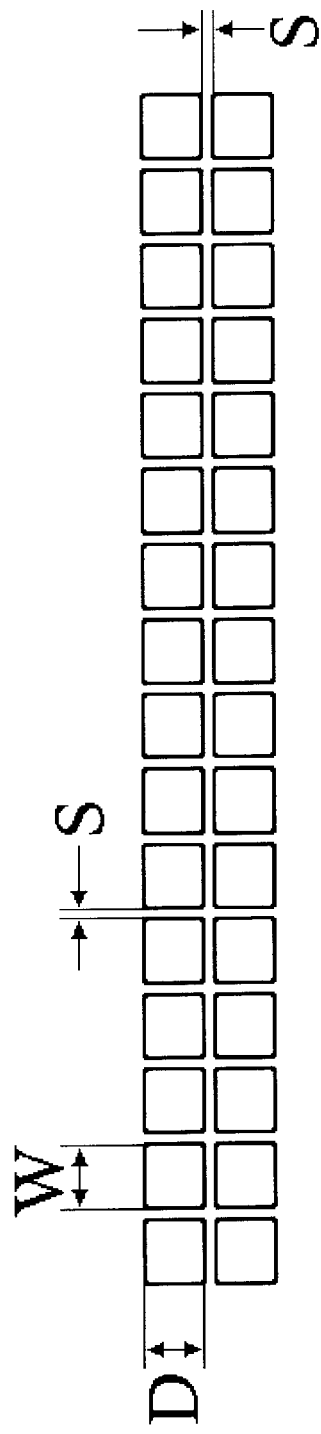
FIG. 5B illustrates dimensional aspects of an exemplary non-polar capacitor array, such as that of FIG. 5A.

In this embodiment, which is depicted in FIGS. 5A and 5B, the anode rod 18 of each polar capacitor element 10 is bent at a 90 degree angle. When positioned in the holding fixture, the anode rods of two adjacent capacitor slugs 10 advantageously overlap, and are welded together. The bending and welding of the anode rods may be performed before or after positioning the capacitor slugs in the holding fixture. However, it is usually preferable to perform the welding as the pairs of capacitors are introduced into the holding fixture, so that the weld is created with the slugs the proper distance from each other. The welding of anode rods 18 advantageously breaks through the oxide layer coating the anode rods, and electrically and mechanically connects the two polar capacitors that make up a single non-polar capacitor within the array.

Manipulation of tantalum anode rods is traditionally considered undesirable due to the fragile nature of the connection to the capacitor body and the frailty of the tantalum rod itself. However, the anode rod bending performed in the present embodiment is not subject to the disadvantages heretofore experienced, mainly because each rod is bent only once, then welded, and is not thereafter manipulated.

Once the capacitor slugs 10 are in place in the holding fixture, with the anode rods of each capacitor pair welded together, an insulating material, such as non-conductive epoxy, and more preferably potting compound is introduced into the spaces between the slugs. The holding fixture preferably has sides tall enough to allow the insulating material to encase the welded anode rods. Once the insulating material has hardened, the capacitor array is removed from the holding fixture.

The insulating material of the embodiment shown in FIGS. 5A and 5B is illustrated with phantom (i.e., dashed) lines. The total height H of the array is preferably less than 7.00 mm (0.275 inch), more preferably less than 6.35 mm (0.250 inch), and most preferably about 6.00 mm (0.237 inch). The width W of each individual capacitor slug 10 is preferably less than 2.54 mm (0.100 inch), more preferably less than 2.25 mm (0.089 inch), and most preferably about 2.00 mm (0.078 inch). The depth D of each individual capacitor slug 10 is preferably less than 2.54 mm (0.100 inch), more preferably less than 2.03 mm (0.080 inch), and most preferably about 1.73 mm (0.068 inch). The space S between slugs is preferably less than 0.50 mm (0.020 inch), more preferably less than 0.30 mm (0.012 inch), and most preferably about 0.20 mm (0.008 inch) to 0.23 mm (0.009 inch). In all dimensions, the smallest dimension is preferred.

The holding fixture preferably allows the surfaces of the capacitor slugs 10 along the periphery of the capacitor array to largely define the edges of the capacitor array. As such, it is preferred that very little of the insulating material is allowed to pass between the outer edges of the capacitor slugs 10 and the holding fixture. The amount of material is preferably enough to ensure the cohesiveness of the capacitor array without substantially adding to the outer dimensions of the array. Once again, a coat of silver (or other conductive material) is preferably applied to the bottom surfaces of the capacitor slugs making up the array, in preparation for conductive epoxy (or the like) attachment to a destination substrate such as circuit board contact pad 14.

A further embodiment, shown in FIGS. 6A and 6B, comprises a shell 50 in which capacitor slugs 10 are placed. The anode rods 18 may then be bent and welded, and an encapsulant/adhesive applied to the entire assembly. In this embodiment, shell 50 plays the role of the holding fixture, and also becomes an integral part of the capacitor array. Of course, to produce a single non-polar capacitor, a shell with only two cells, rather than 32 cells, is provided.

Figure 6C:
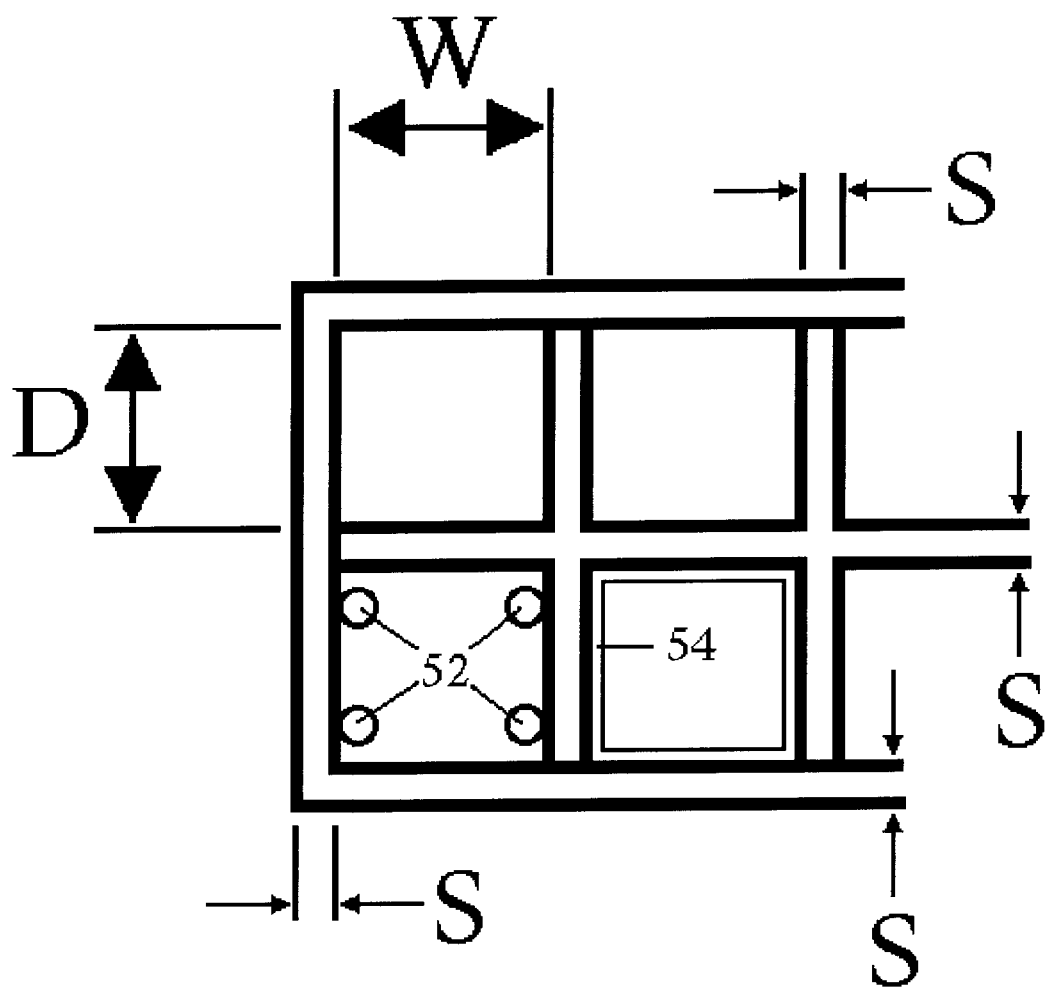
FIG. 6C illustrate a detailed, sectional view of portion C as highlighted in FIG. 6A.

Tabs 52 or a ledge 54 are preferably, but not necessarily, formed at the base of each cell in shell 50, as shown in FIG. 6C. The tabs or ledge position the bottom of each capacitor slug 10 a preferred distance of space S from the base of shell 50. This space provides a recess below each capacitor slug 10 and separated from the other cells of shell 50, which is then preferably filled with conductive epoxy that is advantageously used to electrically and mechanically connect the non-polar capacitors of the capacitor array to a circuit board contact pad 14.

The tantalum capacitors and capacitor arrays of the subject invention yield improved characteristic properties. Exemplary embodiments as presented herein of a single nonpolar tantalum capacitor at about 25 Volts are rated at about 6 $\mu$F. When tested at frequencies of around 120 Hz, the subject capacitor has a dissipation factor (DF) of less than 6%. When tested at an estimated frequency of 100 kHz, the equivalent series resistance (ESR) was about 1 $\Omega$. It may be generally preferred for such a capacitive structure to be characterized by both low DF and low ESR.

Additional improved characteristics of the subject tantalum capacitor are related to the volume and footprint of the device. The footprint is generally defined as the surface area on a printed wire board or other appropriate surface that the device will take up when mounted thereon. Typical measurements of the capacitance-voltage (CV) per footprint area of a single non-polarized tantalum capacitor is about 1,800 $\mu$FV/cm$^2$. This is generally twice the footprint efficiency of other known non-polarized tantalum capacitors.

The tantalum anode in typical surface mount devices accounts for roughly one-third of the volume of the packaged device. The disclosed tantalum capacitor technology greatly improves upon such typical volumetric efficiency. Volumetric efficiency as measured for selected embodiments of the present non-polarized capacitor is about 4,000 $\mu$FV/cm$^3$. Given that a non-polar tantalum capacitor is rated at about 6 $\mu$F at about 25 V, a single tantalum entity of the capacitor pair would be rated at about 12 $\mu$F at a similar voltage. Since such a single (polarized) tantalum capacitor has half the volume and twice the capacitance as the subject non-polarized tantalum capacitor, it has a volumetric efficiency of 16,000 $\mu$FV/cm$^3$. Other similar properties and improved characteristics may be readily appreciated by one of ordinary skill in the art.

While the invention herein disclosed has been described by means of specific embodiments, numerous modifications and variations could be made thereto by those skilled in the art without departing from the scope of the invention set forth in the claims. For instance, more than two rows of polar capacitors 10 may be used, to make for example, a 32 non-polar capacitor array. In another variation, capacitor array separator 44 may extend below the bottom of the capacitor slugs 10, so that conductive epoxy or the like may be more readily individually applied to each capacitor slug. Accordingly, the scope of the present subject matter should be assessed as that of the disclosed variation of embodiments and any equivalents thereto.

What is claimed is:

1. A non-polar tantalum capacitor, comprising:
    a first polar tantalum capacitor unit, wherein said first capacitor unit is characterized by a first end and a second end;
    a second polar tantalum capacitor unit, wherein said second capacitor unit is also characterized by a first end and a second end;
    cathode portions integral with said first end of said first capacitor unit and with said first end of said second capacitor unit and wherein said cathode portion may be utilized for electrical attachment to the capacitor;
    a first anode rod extending from said second end of said first capacitor unit;
    a second anode rod extending from said second end of said second capacitor unit;
    wherein said first and second anode rods are bent at a distance from said second ends of said first and second capacitor units to extend towards each other and are connected to each other to form a joined anode element;
    a first insulating material situated between said first and second capacitor units; and
    a second insulating material encapsulating said anode element.

2. A non-polar tantalum capacitor as in claim 1 further comprising a mounting pad connected to said cathode portions for mounting said tantalum capacitor.

3. A non-polar tantalum capacitor as in claim 1 wherein the first and second capacitor units are generally equivalent structures.

4. A non-polar tantalum capacitor as in claim 1 wherein said first and second anode rods are made of tantalum.

5. A non-polar tantalum capacitor as in claim 4 wherein said joined anode element is formed by welding together said first anode rod and said second anode rod.

6. A non-polar tantalum capacitor as in claim 1 wherein said first insulating material comprises high density polyethylene and wherein said second insulating material comprises non-conductive epoxy.

7. A non-polar tantalum capacitor as in claim 1 wherein said first and second insulating materials comprise the same material.

8. A non-polarized tantalum capacitor as in claim 7 wherein said same material comprises selected of non-conductive epoxy and potting compound.

9. A non-polarized tantalum capacitor as in claim 2 characterized by a mountable surface area rating of about 1800 $\mu$FV/cm$^2$.

10. A non-polarized tantalum capacitor, comprising:
    first and second polarized tantalum capacitor units, wherein each capacitor unit is characterized by a first end and a second end;

a cathode portion integral with said first ends of each said capacitor unit and wherein said cathode portion facilitates electrical attachment to the capacitor;

at least one anode rod extending from selected second ends of said capacitor units;

a first insulating material positioned between adjacent surfaces of said first and second capacitor units;

a first conductive material extending between and electrically coupled to each of said anode rods; and a second insulating material extending across a portion of said second ends of said capacitor units and situated between said second ends of said capacitor units and said first conductive material.

11. The capacitor of claim 10 wherein selected of said first and second ends of said capacitor units are to be mounted to a printed wire board.

12. The capacitor of claim 11 further comprising first and second mounting pads for connection to said first ends of said first and second capacitor units.

13. The capacitor of claim 10 wherein said first and second capacitor units are generally equivalent structures.

14. The capacitor of claim 10 wherein said anode rods are made of tantalum.

15. The capacitor of claim 13 further comprising a second conductive material covering at least a portion of said anode rods for improving the conductivity between said anode rods and said first conductive material.

16. The capacitor of claim 10 wherein said first insulating material comprises high density polyethylene and wherein said second insulating material comprises polyimide.

17. The capacitor of claim 10 wherein said first and second insulating materials comprise the same material.

18. The capacitor of claim 12 characterized by a mountable surface area rating of about 1800 $\mu FV/cm^2$.

19. A non-polarized tantalum capacitor array, comprising:

a plurality of polar tantalum capacitor units arranged in pairs, wherein each polar capacitor unit is characterized by a first end and a second end;

a cathode portion integral with said first ends of selected of said polar capacitor units and wherein said first ends are for positioning of the capacitor array relative to a circuit board;

a plurality of anode rods extending from second ends of selected said capacitor units, and wherein said anode rods are bent at a distance from said second ends of said capacitor units for connecting to other of said anode rods;

a first insulating material situated among selected adjacent surfaces of said plurality of capacitor units; and a second insulating material encapsulating said anode rods.

20. A tantalum capacitor array as in claim 19 wherein said plurality of capacitor units are substantially equivalent structures.

21. A tantalum capacitor array as in claim 19 wherein said plurality of anode rods comprise tantalum.

22. A tantalum capacitor array as in claim 21 wherein anode rods extending from each respective capacitor unit in each said pair of capacitor units are connected to each other with a weld.

23. A tantalum capacitor array as in claim 19 wherein said first insulating material is high density polyethylene and wherein said second insulating material is non-conductive epoxy.

24. A tantalum capacitor array as in claim 19 wherein said first and second insulating materials are the same material.

25. A tantalum capacitor array as in claim 24 wherein said same material comprises selected of non-conductive epoxy and potting compound.

26. A tantalum capacitor array as in claim 19, further comprising a plurality of mounting pads connected to respective first ends of each said capacitor unit for facilitating mounting of said tantalum capacitor array to a destination substrate.

27. A non-polarized tantalum capacitor array, comprising:

a plurality of polarized tantalum capacitor units arranged in pairs, wherein each capacitor unit of a capacitor pair is configured to extend out from a mountable surface, thus characterizing said capacitor units as having a mountable side and an extended side opposite from said mountable side;

a plurality of anode rods extending from said extended sides of each of said capacitor units;

a cathode portion integral with said mountable sides of each said capacitor unit and useful for electrical attachment to the capacitor array;

a first insulating material situated between adjacent surfaces of said respective capacitor units;

a first conductive material touching and extending between said anode rods of each capacitor pair; and a second insulating material extending across at least a portion of said respective extended ends of said capacitor units and situated between extended ends of each respective capacitor unit and said first conductive material.

28. The capacitor array of claim 27, wherein said plurality of capacitor units are generally equivalent structures.

29. The capacitor array of claim 27, wherein said anode rods are made of tantalum.

30. The capacitor array of claim 29, further comprising a second conductive material covering at least a portion of said anode rods for improving the conductivity between said anode rods and said first conductive material.

31. The capacitor array of claim 27, wherein said first insulating material comprises high density polyethylene and wherein said second insulating material comprises polyimide.

32. The capacitor array of claim 27, wherein said first and second insulating materials comprise selected of non-conductive epoxy and potting compound.

33. The capacitor array of claim 27, further comprising a plurality of mounting pads connected to respective mountable sides of said capacitor units for mounting said array on an appropriate surface.

* * * * *